(12) United States Patent
Goertz

(10) Patent No.: US 9,555,763 B2
(45) Date of Patent: Jan. 31, 2017

(54) AIRBAG MODULE WITH A THREE-DIMENSIONALLY STRUCTURED VENT ARRANGEMENT

(71) Applicant: Autoliv Development AB, Vårgårda (SE)

(72) Inventor: Christoph Goertz, Röhrmoos (DE)

(73) Assignee: AUTOLIV DEVELOPMENT AB, Vargarda (SE)

( * ) Notice: Subject to any disclaimer, the term of this patent is extended or adjusted under 35 U.S.C. 154(b) by 0 days.

(21) Appl. No.: 14/422,566

(22) PCT Filed: Aug. 16, 2013

(86) PCT No.: PCT/EP2013/002463
§ 371 (c)(1),
(2) Date: Feb. 19, 2015

(87) PCT Pub. No.: WO2014/029482
PCT Pub. Date: Feb. 27, 2014

(65) Prior Publication Data
US 2015/0239420 A1    Aug. 27, 2015

(30) Foreign Application Priority Data
Aug. 24, 2012    (DE) .................. 10 2012 107 802

(51) Int. Cl.
*B60R 21/239*    (2006.01)
*B60R 21/2338*    (2011.01)
*B60R 21/235*    (2006.01)

(52) U.S. Cl.
CPC ........... *B60R 21/239* (2013.01); *B60R 21/235* (2013.01); *B60R 21/2338* (2013.01);
(Continued)

(58) Field of Classification Search
CPC .. B60R 21/239; B60R 21/235; B60R 21/2338; B60R 2021/23388; B60R 2021/2395; B60R 2021/23509; B60R 2021/23384
See application file for complete search history.

(56) References Cited

U.S. PATENT DOCUMENTS 7,328,915 B2 *    2/2008    Smith .................. B60R 21/2338
                                                    280/739
7,347,450 B2 *    3/2008    Williams ............ B60R 21/2338
                                                    280/739
(Continued)

FOREIGN PATENT DOCUMENTS

DE           695 09 938 T2      1/2000
DE    10 2008 021 623 A1       11/2008
(Continued)

OTHER PUBLICATIONS

PCT International Search Report—Oct. 4, 2013.

*Primary Examiner* — Paul N Dickson
*Assistant Examiner* — Timothy Wilhelm
(74) *Attorney, Agent, or Firm* — Brinks Gilson & Lione

(57) ABSTRACT

A motor vehicle airbag module having an airbag consisting of an airbag fabric, and an inflation device The airbag having a ventilation area closed by a covering prior to inflation. A restraining strap has one end in the interior of the airbag detachably mounted on a fixed compartment and another end affixed on the covering. On inflation of the airbag before the release of the restraining strap, the strap holds the covering closing the ventilation area. The covering is a three-dimensional element which is connected via at least one partial area of its perimeter to the airbag fabric and that it can be folded such that, on release of the restraining strap, the three-dimensional element is unfolded due to the effect of the gas flowing from the ventilation area into the covering The covering is held in position in a detachable overlap with a part of the airbag.

16 Claims, 4 Drawing Sheets

(52) U.S. Cl.
 CPC ............... *B60R 2021/2395* (2013.01); *B60R 2021/23384* (2013.01); *B60R 2021/23388* (2013.01); *B60R 2021/23509* (2013.01)

(56) References Cited

U.S. PATENT DOCUMENTS

| | | | | |
|---|---|---|---|---|
| 7,448,646 B2* | 11/2008 | Hall | ............... | B60R 21/2338 280/739 |
| 7,475,906 B2* | 1/2009 | Goto | ............... | B60R 21/2338 280/738 |
| 7,600,782 B2* | 10/2009 | Ishiguro | ............... | B60R 21/239 280/739 |
| 7,954,850 B2* | 6/2011 | Fischer | ............... | B60R 21/233 280/738 |
| 8,419,058 B2* | 4/2013 | Fischer | ............... | B60R 21/233 280/728.1 |
| 8,491,004 B2* | 7/2013 | Mendez | ............... | B60R 21/2338 280/739 |
| 8,696,022 B2* | 4/2014 | Fischer | ............... | B60R 21/2338 280/739 |
| 9,199,602 B1* | 12/2015 | Fischer | ............... | B60R 21/239 |
| 2011/0198828 A1* | 8/2011 | Fischer | ............... | B60R 21/233 280/743.2 |
| 2012/0153603 A1* | 6/2012 | Mallinger | ............... | B60R 21/239 280/739 |

FOREIGN PATENT DOCUMENTS

| | | |
|---|---|---|
| DE | 10 2007 045 549 A1 | 4/2009 |
| DE | 10 2009 018 159 A1 | 11/2010 |
| EP | 1 790 538 A2 | 5/2007 |
| EP | 2 048 040 A1 | 4/2009 |

\* cited by examiner

AIRBAG MODULE WITH A THREE-DIMENSIONALLY STRUCTURED VENT ARRANGEMENT

CROSS REFERENCE TO RELATED APPLICATIONS

This application claims priority to German Patent Application No. 10 2012 107 802.5, filed on Aug. 24, 2012 and PCT International Patent Application No. PCT/EP2013/002463, filed on Aug. 16, 2013.

FIELD OF THE INVENTION

The invention relates to an airbag module for installation into a motor vehicle having an airbag consisting of an airbag fabric and having an inflation device for the folded airbag prior to deployment. The airbag having a ventilation area sealed by means of a covering before the inflation of the airbag, and wherein a restraining strap is provided such that its one end is detachably fixed to the airbag module, or mounted on a vehicle-fixed part, in the interior of the airbag, and its other end is attached to the covering. During the inflation of the airbag, before the release of the detachably fixed end of the restraining strap, the restraining strap holds the covering in the position closing the ventilation area.

BACKGROUND

An airbag module having the features mentioned above is described in document EP 1 790 538 A2. Insofar as the adaptive ventilation opening forming the ventilation area configured on the generic object in order to keep the ventilation opening to be closed, and the release of the ventilation opening to be enabled only at a definable time during the inflation of the airbag, or after the inflation thereof, in the known airbag module, the covering consists of two mutually overlapping fabric cuttings arranged outside on the airbag fabric and covering the ventilation opening. In order to initially keep the fabric cuttings in their position closing the ventilation opening, a restraining strap is provided which is secured with one end to a module-sided holding device arranged in the interior of the airbag. The other end of the restraining strap is led to the outside of the airbag via an opening arranged on the outside of the fabric cutting forming the covering and is secured to the outside of the two mutually overlapping fabric cuttings. The length of the restraining strap is dimensioned such that, when the airbag is inflated, the outer fabric cutting is held by the restraining strap in its extended position and thereby also pressing the inner fabric cutting lying underneath against the airbag fabric, so that the ventilation opening is closed by the two fixed fabric cuttings. Only after activation of the retaining device upon release of the end of the restraining strap secured thereon does the restraining strap sliding through the opening allow an automatic unfolding of the two mutually overlapping fabric cuttings toward the outside as a kind of bird's wings, so that the ventilation opening is thereby released.

The known airbag module is associated with the disadvantage that the opening needed in addition to the ventilation opening and used for the passage of the restraining strap inherently forms an unsealed area in the airbag, which allows an undesirable ventilation of the airbag even when the ventilation opening is to be held closed. Owing to the required threading of the restraining strap through said opening, the installation of the airbag is also hindered. Finally, the opening behavior of the fabric cuttings pressed flat on each other can be insufficient upon release of the restraining strap due to the gas pressure merely acting via the cross section of the ventilation opening.

It is therefore the underlying object of the present invention to design the covering of the ventilation opening and the release thereof in an airbag module having the generic features in a simple and efficient manner.

SUMMARY AND INTRODUCTORY DESCRIPTION OF THE INVENTION

This above-described object is attained by favorable embodiments and further developments of the invention that are evident from the appended description and drawings.

In principle, the invention provides that the covering is configured as a three-dimensional element which is firmly connected to the airbag fabric over at least one partial area of its perimeter and which can be unfolded around this partial area such that, upon release of the restraining strap, the three-dimensional element is unfolded due to the effect of the gas flowing from the ventilation area into the covering formed by the three-dimensional element, and releases the ventilation area of the airbag, wherein the circumferential area of the three-dimensional element not connected to the airbag is held in its covering position in a detachable overlap with a part of the airbag, and the restraining strap running in the interior of the airbag is pressed against the three-dimensional element within the area covered by the covering.

The advantage associated with the invention is that, owing to the three-dimensional configuration of the covering, the gas flowing through the ventilation opening unfolds the three-dimensional element already before its release by the restraining strap and inflates it to its shape. To the extent that the three-dimensional element is held in its closed position for the ventilation opening as a result of the interior contact with the restraining strap, a sufficiently large gas pressure builds up, which causes the three-dimensional element to fold away smoothly with a complete release of the ventilation opening when the restraining strap is released. It is furthermore an advantage that the restraining strap is in any case led to the three-dimensional element within the area covered by the covering, and then makes contact there. In this way, the tightness of the covering is ensured, also in respect of the integration of the restraining strap in the structure of the airbag.

An additional advantage is that due to the three-dimensional configuration of the covering for the ventilation area, in contrast to the very high stress on the restraining strap that holds the covering in the case of a two-dimensional covering, the distribution of the forces acting on the covering, and thus on the restraining strap that holds the covering, is improved. These forces acting on the covering are distributed in different directions owing to the spatial volume, as a result of which the covering fabric attached to the airbag is included in the force deflection and accordingly relieves the restraining strap.

According to the present invention, in line with the material of the airbag, the foldable three-dimensional element consists of a textile material, and, by determining the cutting, folding and sewing, is configured of a flat material, such that, for example, its three-dimensional shape is formed upon "inflation". In this way, the three-dimensional element attached to the airbag can be folded into the airbag module with no problem when the airbag is folded into the airbag module, and therefore does not affect the accommodation of the airbag in an associated airbag module.

In a first embodiment of the invention, it is provided that the foldable three-dimensional element rests against the airbag fabric on the inside of the airbag with an outer peripheral edge area and, upon inflation of the airbag, extends outward through the ventilation opening, wherein the outer circumferential edge area is firmly attached to the airbag fabric on a partial area of the perimeter of the foldable three-dimensional element, and the partial area of the circumferential edge area not connected to the airbag fabric forms the detachable overlap with the airbag fabric, and that the restraining strap is pressed on the inside against the partial area not connected to the airbag fabric, or against the three-dimensional element.

If a corresponding gas pressure is acting upon inflation of the airbag, then the three-dimensional element is, on the one hand, unfolded and extends outward through the ventilation opening, and, on the other hand, the gas pressure presses the edge area of the three-dimensional element not connected to the airbag fabric from the inside against the airbag fabric, so that the three-dimensional element fixed by the restraining strap in the covering position, is thus secured in a sealing manner to the airbag fabric. In so far as the three-dimensional element is located in the interior of the airbag with its partial area of its edge area forming the detachable overlap, it is not a problem to press the associated end of the restraining strap from the inside of the airbag against the edge area not connected to the airbag fabric, or against the three-dimensional element in this area. In particular, it can specifically be provided in this case that the foldable three-dimensional element is configured as a tetrahedron having a triangular base area, wherein one triangular side of the tetrahedron is firmly connected to the airbag fabric, and the detachable overlap is arranged with the airbag fabric along each of the two other triangular sides. With respect to the guide of the restraining strap, it can be provided that on the inside of the airbag fabric in its area adjacent to the stop of the restraining strap a guide accommodating the restraining strap is arranged on the three-dimensional element.

In an alternative embodiment of the invention, it is provided that the foldable three-dimensional element is arranged on the outside of the airbag, and that in addition to the foldable three-dimensional element, a second, fixed three-dimensional element, likewise attached to the outside of the airbag, is provided and attached to the airbag fabric along a line surrounding the ventilation area on the circumferential area not covered by the connection of the airbag fabric with the foldable three-dimensional element, wherein the foldable three-dimensional element and the fixed three-dimensional element engage into each other and jointly cover the ventilation area in a mutual overlap and, upon release of the restraining strap, the foldable three-dimensional element is moved out of the overlap with the fixed three-dimensional element. In this respect, in comparison with the previously described embodiment, the strip-like protrusion is replaced by a second three-dimensional element which is firmly secured on the outside of the airbag and which forms the overlap with an additional foldable three-dimensional element required for the covering.

According to a first exemplary embodiment, with respect to the configuration of the three-dimensional element it is hereby provided that the two mutually engaging three-dimensional elements are each configured as tetrahedrons, wherein, in the area of the fixed tetrahedron connected by two triangular sides to the airbag fabric and protruding over the airbag fabric, an open triangular surface is configured, and the foldable tetrahedron closes the open triangular surface of the fixed tetrahedron with one of its triangular surfaces and configures an overlap with the two triangular surfaces of the fixed tetrahedron with its other two triangular surfaces. A geometric configuration of this kind is associated with the advantage that the mutually adjoining triangular surfaces of the two mutually engaging tetrahedrons will mutually seal due to the gas pressure.

In accordance with a preferred embodiment, it is provided that the foldable tetrahedron is arranged in the interior of the fixed tetrahedron and the restraining strap is secured to the inner tip of the foldable tetrahedron, wherein the lead-through opening for the restraining strap is arranged outside the foldable tetrahedron but inside the area of the covering covered by the fixed tetrahedron. This is associated with the advantage that, when gas flows out through the ventilation area covered by the two three-dimensional elements, the gas pressure presses the triangular surfaces of the inner, fixed tetrahedron against the triangular surfaces of the outer, foldable tetrahedron, as a result of which the sealing of the ventilation area by the covering formed by the two tetrahedrons is improved. Insofar as, in this embodiment, the lead-through opening for the restraining strap is arranged in the area sealed by the tetrahedron, a separate seal of this lead-through opening can be omitted.

The invention can also be realized with other embodiments of mutually engaging three-dimensional elements. An example of this is an exemplary embodiment of the invention in which the two mutually engaging three-dimensional elements of the covering are each configured as mutually engaging and mutually overlapping hemispherical shells whose respective base lines connected to the airbag fabric jointly enclose the at least one ventilation area.

Finally, according to alternative exemplary embodiments, it can be provided that the ventilation area is formed by a single ventilation opening covered by the two three-dimensional elements acting as covering, or by a plurality of ventilation openings with a possibly correspondingly smaller cross section, wherein the plurality of ventilation openings are jointly covered by the two three-dimensional elements.

Insofar as the foldable three-dimensional element is moved from its overlap with the airbag or with the fixed three-dimensional element for the ventilation of the airbag to be effected via the release of the restraining strap, according to another exemplary embodiment of the invention, it is provided that to limit the movement of the foldable three-dimensional element on the part of the restraining strap running in the interior of the airbag, a stop device is arranged, which, upon release of the detachably mounted end of the restraining strap, interlocks with respect to the guide or lead-through opening after sliding through a specified segment of the restraining strap or lead-through opening. In this manner, it is possible to define the end position of the foldable three-dimensional element with respect to the airbag and/or with respect to the fixed three-dimensional element, so that a defined outflow opening is obtained for the gas exiting the ventilation area, and/or outlet openings are obtained, and thus the gas flow exiting in a desired direction upon ventilation of the airbag can be in particular be deflected away from the vehicle passengers.

BRIEF DESCRIPTION OF THE DRAWINGS

The drawing reproduces exemplary embodiments of the invention which are described below, and show.

FURTHER DESCRIPTION OF THE INVENTION

Figure 1:
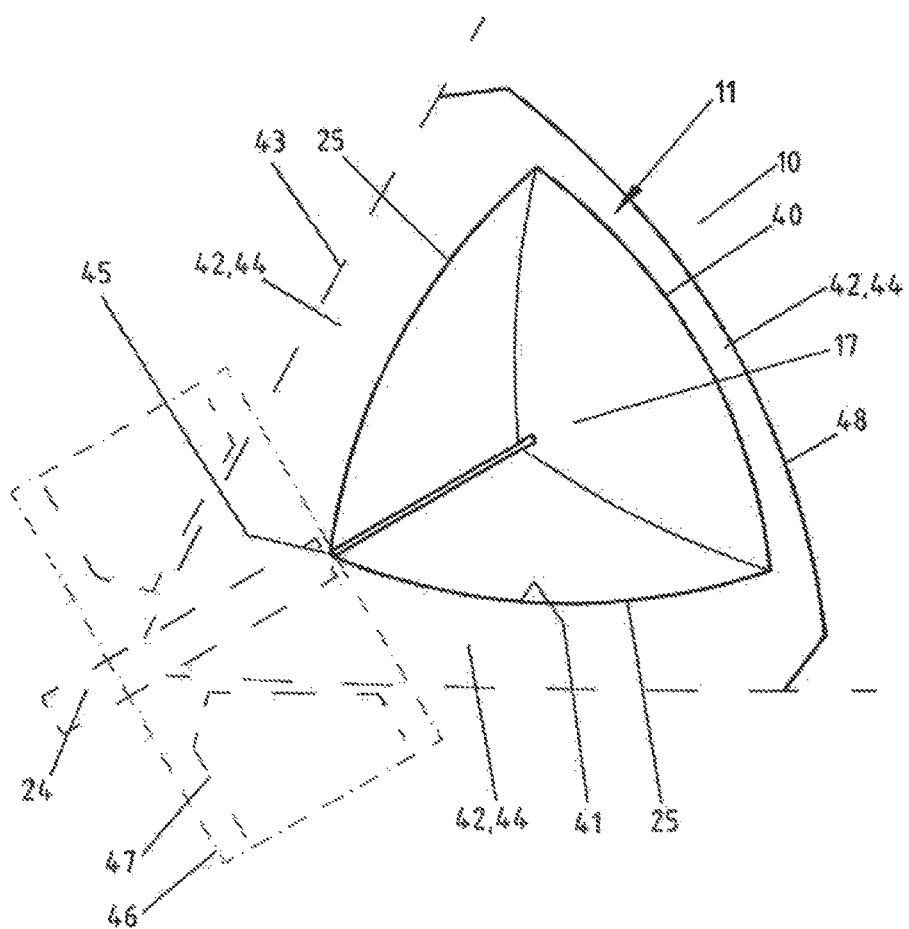
FIG. 1 is a perspective view of the covering configured as a three-dimensional element for the ventilation opening of an airbag in its closed position with the three-dimensional element under gas pressure and "inflated."

As is first evident from FIG. 1, a covering 11 is attached to an airbag which is not shown in detail, formed by an airbag fabric 10, said covering likewise consists of a three-dimensional element 17 made of textile fabric, which element in its unfolded state deployed in its three-dimensional shape, closes or releases a ventilation area located under the covering 11 and configured as a ventilation opening 25 in the shown exemplary embodiment.

The foldable three-dimensional element 17 configured as a tetrahedron with a triangular base area is secured to the airbag fabric 10 of the airbag by an outer, circumferential edge area 42. The outer circumferential edge area 42 in this case rests against the airbag fabric 10 from the inside of the airbag fabric 10 and therewith forms a circumferential overlapping area 44. The three-dimensional element 17 extends through the ventilation opening 25 and thus covers it. The three-dimensional element 17 is firmly joined on its (right) outer triangular side 40 to the airbag fabric 10, preferentially by means of a seam 48, so that, upon exposure to a corresponding gas pressure, the three-dimensional element 17 can fold out around the seam 48 from the plane of the drawing. On the other two sides 41 of the triangle of the three-dimensional element 17, the edge areas 42 are not joined to the airbag fabric 10, but rather together with the airbag fabric 10 form the detachable overlap 44 that extends from the edge of the ventilation opening 25 to an outer line 43. In the area of the corner 45 located opposite the triangular side 40 there is a restraining strap 24 running along the inside of the airbag against which the three-dimensional element 17 presses as it protrudes from the plane of the drawing. The restraining strap 24 is guided through a guide 46 located on the inside of the airbag and is limited laterally by limits 47 enclosed in the guide 46, so that a linear motion of the restraining strap 24 through the guide 46 is obtained.

Figure 2:
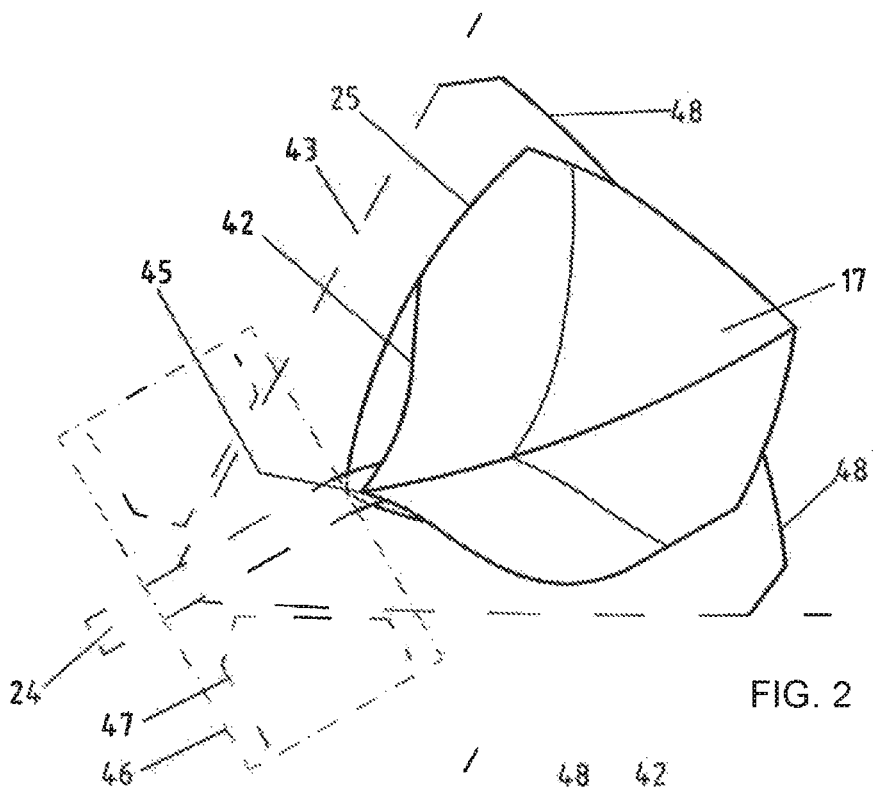
FIG. 2 shows the object of FIG. 1 during a partial unfolding of the three-dimensional element with a partial release of the ventilation opening.
Figure 3:
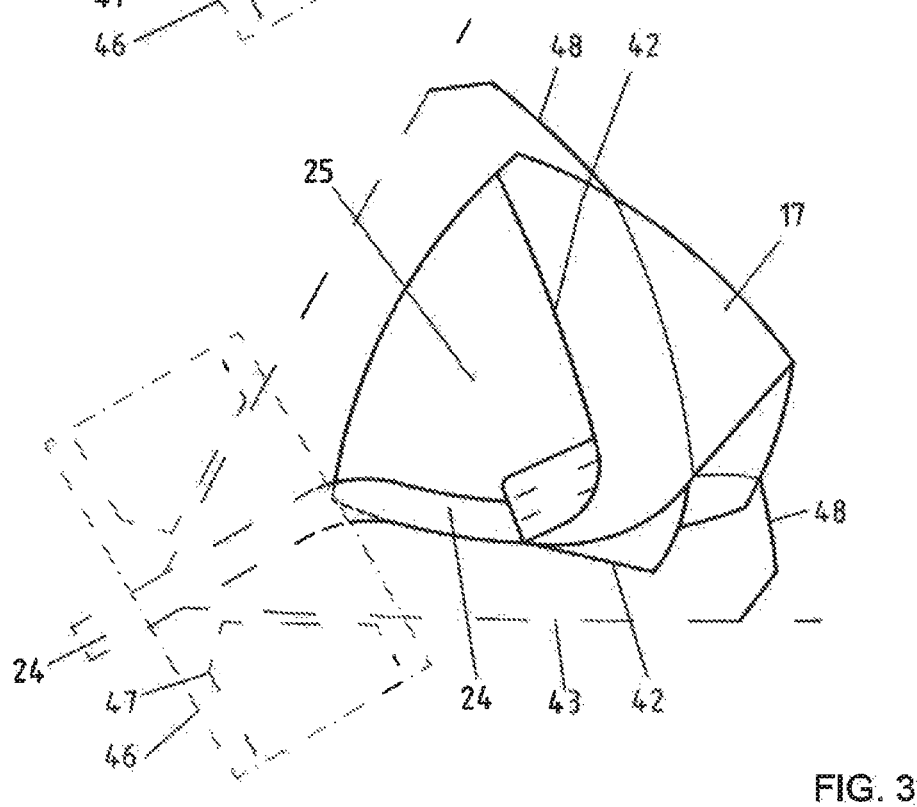
FIG. 3 shows the object of FIG. 2 with an even more advanced, almost complete release of the ventilation opening by the three-dimensional element.
Figure 4:
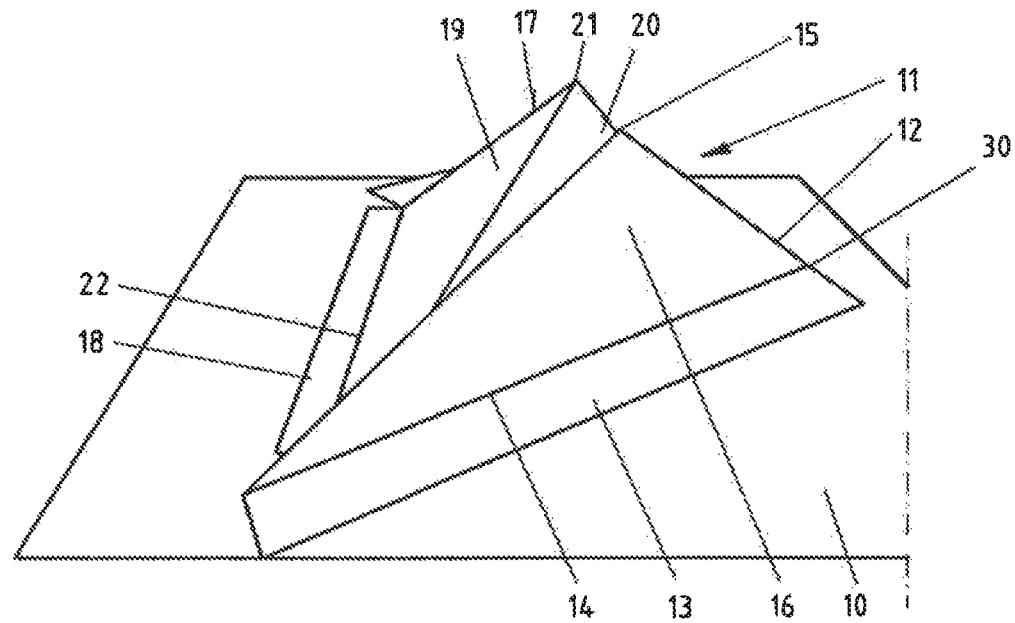
FIG. 4 is a perspective view of a covering consisting of two mutually engaging tetrahedrons as three-dimensional elements for the one ventilation opening in an airbag in its closed position.

The function of the covering illustrated in FIG. 1 is evident from a comparison of FIGS. 1 to 3. Whereas FIG. 1 shows the closed position of the three-dimensional and foldable element 17 forming the covering 11, FIG. 2 shows the intermediate position of the restraining strap 24 that has already been released, so that the restraining strap 24 can slide through the guide 46 and can yield to the folding motion of the three-dimensional element 17 around its triangular side 40. As is also evident from FIG. 2, each of the edge areas 42 configured on the two triangle sides 41 slides out of their overlap with the airbag fabric, so that the triangular element 17 can unfold outward through the ventilation opening 25 and release the ventilation opening 25.

With reference to the exemplary embodiment described below, but not shown in detail, it can be provided that the position of the foldable three-dimensional element 17 is to be fixed in a defined position after the release of the restraining strap 24 relative to the airbag fabric, as a result of which, on the one hand, the deflection direction of the gas flowing out through the ventilation opening 25 can be influenced, or also the cross section of the ventilation opening can be limited. In this respect, a stop device, which is not shown in detail, in the shape of a plug or of a donned stopper, for example, can be provided in the restraining strap 24, so that when the restraining strap 24 slides through the guide 46, the stopper remains in the guide 46 and thus prevents or limits any additional motion of the foldable, three-dimensional element 17.

FIGS. 4 to 8 show a modified embodiment of the invention in which the overlap with the foldable three-dimensional element 17—now located on the outside of the airbag—is configured by an additional, fixed three-dimensional element 12 likewise secured on the outside of the airbag fabric and likewise configured as a tetrahedron. In this respect, the covering 11 consists of two mutually engaged three-dimensional elements 12, 17.

Here, a first tetrahedron 12 with its V-shaped triangular sides 13 enclosing the ventilation opening 25 between them is firmly joined to the airbag fabric 10 via correspondingly arranged seams 14, so that the first tetrahedron 12 having one upper tip 15 and lateral triangular surfaces 16 can be designated as a fixed tetrahedron 12, whose area opposite the tip 30 of the V-shaped triangular sides 13 is held open.

A second, foldable tetrahedron 17 is allocated to the fixed tetrahedron 12, which foldable tetrahedron 17 is joined to the airbag fabric 10 on one triangular side 18 to form its fold line by means of a seam 22 running along this triangular side 18, wherein the triangular side 18 joined to the airbag fabric 10 closes the triangular side left open by the fixed tetrahedron 12. Accordingly, the foldable tetrahedron 17 has a triangular area 19, which closes the triangular area of the fixed tetrahedron 12 that has been left open, and corresponding, lateral triangular areas 20 which form an overlap with the triangular areas 16 of the fixed tetrahedron 12. This is because the front tip 23 of the foldable tetrahedron 17 is located in the interior of the fixed tetrahedron 12, where a distance between the front tip 23 of the foldable tetrahedron 17 and the tip 30 of the fixed tetrahedron 12 formed by the V-shaped triangular sides 13 is given. Since the foldable tetrahedron 17 is only joined with the airbag fabric along its one triangular side 18, the tetrahedron 17 can be folded around this triangular side 18, so that the tetrahedron 17 is movable with respect to the airbag fabric 10 and also with respect to the fixed tetrahedron 12 and is designated as a movable foldable tetrahedron 17.

One end of a restraining strap 24 is attached to the interior front tip 23 of the movable foldable tetrahedron 17; said restraining strap 24 is introduced into the interior of the airbag through a lead-through opening 26 formed in the airbag fabric 10 and arranged in the space between the tips 23 of the movable foldable tetrahedrons 17 and 15 and the fixed tetrahedron 12, and attached to a holding device known from the prior art with the end of said restraining strap, which is not visible.

In accordance with the function of a ventilation device set up in an airbag basically described in the generic document EP 1 790 538 A2, the restraining strap 24 is attached with its area resting in the interior of the airbag to the likewise interior holding device, such that the restraining strap 24 attached to the front tip 23 of the movable foldable tetrahedron 17 holds the tetrahedron 17 in position overlapping with the fixed tetrahedron 12 illustrated in FIG. 1, in which both tetrahedrons 12, 17 jointly cover the ventilation opening 25. While the airbag is folded before being inflated, the two tetrahedrons 12, 17 are folded together with the airbag, since they likewise consist of a textile material. When the airbag is inflated, the gas first also flows through the ventilation opening 25 and first unfolds the two tetrahedrons 12, 17. However, a further discharge of gas is subsequently no longer possible because the ventilation opening 25 is entirely covered and sealed in the position of the two tetrahedrons 12, 17 established by the restraining strap 24 before the release of the holding device, as indicated in FIG. 1.

If the end of the restraining strap 24 is released from the holding device to cause a ventilation of the inflating or inflated airbag, then the restraining strap 24 slides through the lead-through opening 26 so that the movable foldable tetrahedron 17 unfolds with respect to the fixed tetrahedron 12 under the continued effect of the gas pressure, as is illustrated in FIG. 2. The ventilation opening 25 is released in this position.

Figure 7:
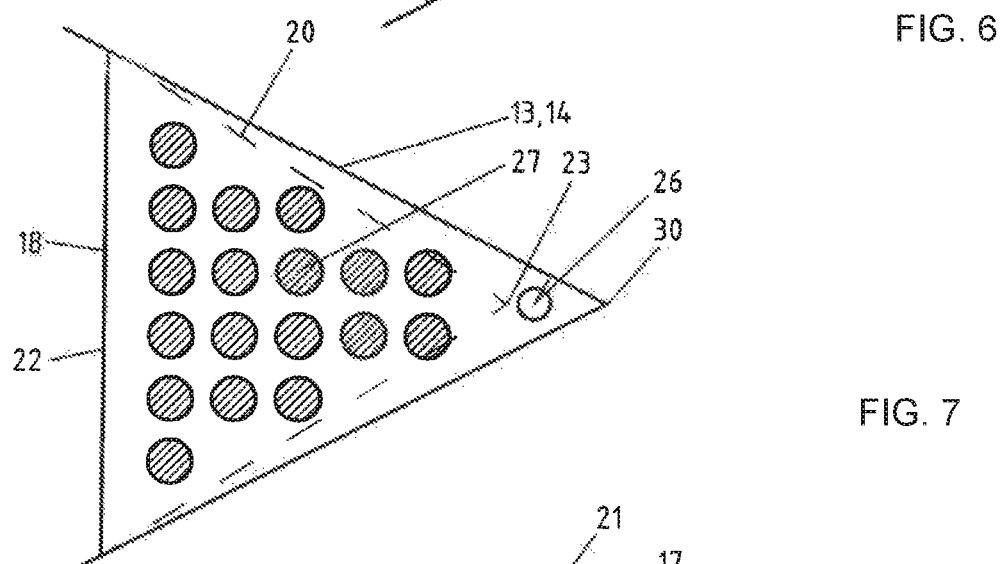
FIG. 7 shows the object of FIG. 6 with a ventilation area consisting of several ventilation openings.

As is evident in FIG. 7, the correspondingly provided ventilation area of the airbag can also be formed by a plurality of small ventilation openings 27, however, without any changes in the configuration of the covering 11 formed by the two tetrahedrons 12, 17.

Figure 5:
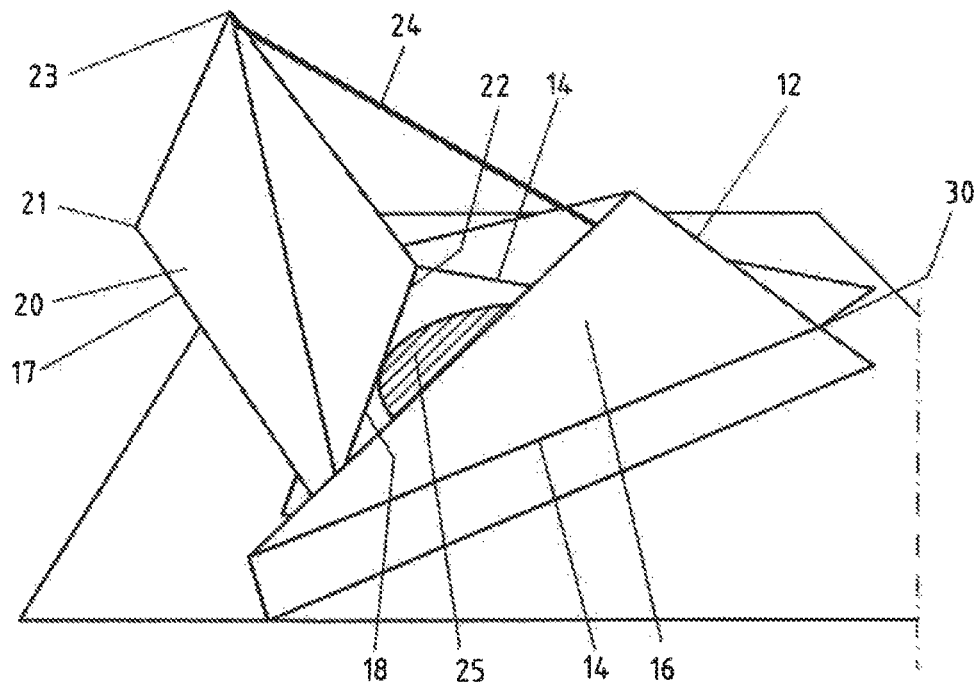
FIG. 5 shows the covering according to FIG. 4 after initiation of the ventilation with the movable, second tetrahedron folded away from the first, fixed tetrahedron.
Figure 6:
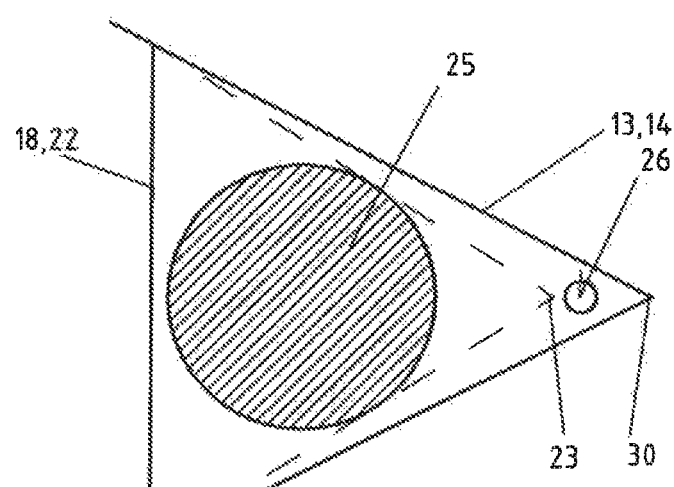
FIG. 6 is a schematic plan view of the arrangement of the two tetrahedrons on the outside of the airbag fabric.
Figure 8:
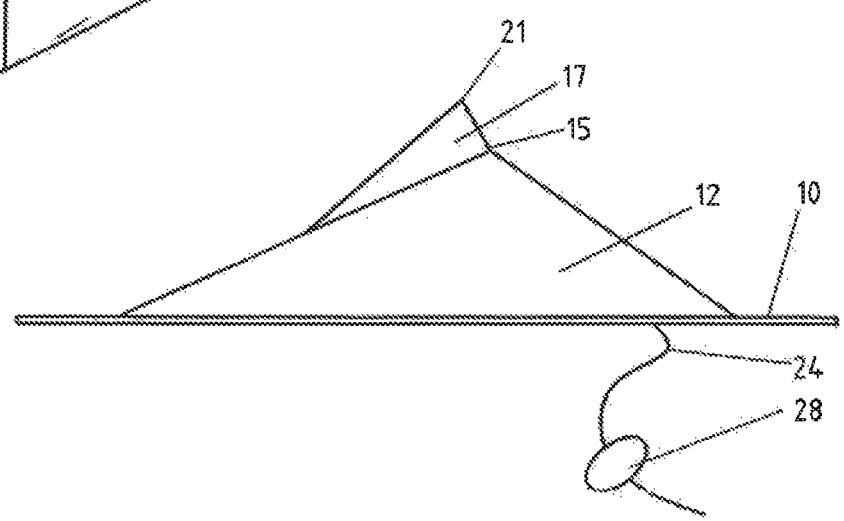
FIG. 8 is a schematic side view of the object of FIG. 4.

As is indicated in FIG. 5, it can be provided that the position of the movable foldable tetrahedron 17 is in a defined position relative to the fixed tetrahedron 12 after the release of the restraining strap 24 in order that directed gas flow openings are created between the two tetrahedrons 12 and 17, which openings can be configured according to the design of the two tetrahedrons 12 and 17 on the one hand, and by the position of the movable, foldable tetrahedron 17 relative to the fixed tetrahedron 12 to be specified by the length of the restraining strap 24. Thus for example, the exiting gas flow can be deflected away from the vehicle passengers. As is indicated in FIG. 8, a stop device 28 can be arranged for this purpose on the part of the restraining strap 24 running in the interior of the airbag which limits the length of the restraining strap 27 sliding through the lead-through opening 26, so that a defined position of the movable foldable tetrahedron 17 can be adjusted in this way.

The features of the subject matter of this document disclosed in the above description, the patent claims, the abstract and the drawing can be essential to the implementation of the invention in its various embodiments individually, or in any combination with each other.

While the above description constitutes the preferred embodiment of the present invention, it will be appreciated that the invention is susceptible to modification, variation and change without departing from the proper scope and fair meaning of the accompanying claims.

The invention claimed is:

1. An airbag module for installation into a motor vehicle having an airbag comprising an airbag fabric, an inflation device for inflation of the airbag in a folded state for deployment, wherein the airbag has a ventilation area closed by a foldable three-dimensional element before the inflation of the airbag, and wherein a restraining strap is provided with a first end that is detachably mounted in the interior of the airbag module or on a vehicle-fixed part, and with a second end affixed to the foldable three-dimensional element, such that during the inflation of the airbag, before the release of the detachably mounted first end of the restraining strap, the restraining strap holds the foldable three-dimensional element in a position closing the ventilation area, the foldable three-dimensional element is firmly connected to the airbag fabric via at least a first partial area of its perimeter and which can be folded around the first partial area such that, on release of the restraining strap, the foldable three-dimensional element deflected due to the effect of the gas flowing from the ventilation area and moves to a position opening the ventilation area of the airbag, wherein a second partial area of the perimeter of the foldable three-dimensional element not connected to the airbag is held in the position closing the ventilation area in a detachable overlap with a part of the airbag and the restraining strap running in the interior of the airbag and affixed to the foldable three-dimensional element, wherein the foldable three-dimensional element is configured as a tetrahedron having a triangular base area with triangular sides extending from a perimeter of the triangular base area to define a substantially pyramid-shape while the ventilation area of the airbag is closed by the foldable three-dimensional element.

2. An airbag module according to claim 1, further comprising in that on the inside of the airbag fabric there is a guide accommodating the restraining strap in the area adjacent to the foldable three-dimensional element.

3. An airbag module according to claim 2 further comprising in that to limit the motion of the foldable three-dimensional element on the part of the restraining strap running in the interior of the airbag a stop device is arranged, which, on release of the detachably mounted first end of the restraining strap, interlocks with respect to the guide or lead-through opening after sliding a specified segment of the restraining strap through the guide or the lead-through opening.

4. The airbag module according to claim 1, further comprising in that the foldable three-dimensional element is arranged on the outside of the airbag and, a fixed three-dimensional element is attached to the airbag fabric along a line surrounding the ventilation area on the circumferential area not covered by the connection of the airbag fabric with the foldable three-dimensional element, wherein the foldable three-dimensional element and the fixed three-dimensional element engage into each other and jointly cover the ventilation area in a mutual overlap and, on inflation of the airbag and release of the restraining strap, the foldable three-dimensional element is moved out of the overlap with the fixed three-dimensional element.

5. The airbag module according to claim 4, further comprising in that the foldable and the fixed mutually engaging three-dimensional elements are each configured as tetrahedrons, wherein the fixed three-dimensional element forms a first tetrahedron connected on two triangular sides to the airbag fabric protruding over the airbag fabric, an open triangular area is configured, and the foldable three-dimensional element forms the tetrahedron defined as a second tetrahedron having one of its triangular surfaces closes the open triangular area of the fixed foldable three-dimensional element and with its other two triangular areas configures an overlap with the two triangular areas of the second tetrahedron.

6. An airbag module according to claim 4 further comprising in that the foldable three-dimensional element is arranged in the interior of the fixed three-dimensional element and the restraining strap running in the interior of the airbag is guided to the outside of the airbag through a lead-through opening arranged outside of the folding three-dimensional element, but inside of the area of the foldable three-dimensional element covered by the fixed three-dimensional element and is secured there to an interior tip of the foldable three-dimensional element.

7. An airbag module according to claims 4 further comprising in that the ventilation area is formed by a ventilation opening jointly covered by the fixed and the foldable three-dimensional elements.

8. An airbag module according to claim 4 further comprising in that the foldable and the fixed three-dimensional elements are formed of a flexible material compressible into a generally flat condition when the airbag is in the folded condition, and assuming the three-dimensional configuration upon inflation of the airbag.

9. An airbag module according to claim 1 further comprising in that to limit the motion of the foldable three-dimensional element a stop device is arranged on the part of the restraining strap running in the interior of the airbag, which, on release of the detachably mounted first end of the restraining strap, interlocks with respect to a guide or a lead-through opening after sliding a specified segment of the restraining strap through the guide or the lead-through opening.

10. An airbag module according to claim 1 further comprising in that the foldable three-dimensional element is formed of a flexible material compressible into a generally flat condition when the airbag is in the folded condition, and assuming the three-dimensional configuration upon inflation of the airbag.

11. An airbag module according to claim 1 further comprising that the detachable overlap is formed with a part of the airbag forming the ventilation area.

12. An airbag module according to claim 1 further comprising that the detachable overlap is formed with a fixed three-dimensional element cooperating with the foldable three-dimensional element forming the ventilation area.

13. An airbag module for installation into a motor vehicle having an airbag comprising an airbag fabric, an inflation device for inflation of the airbag in a folded state for deployment, wherein the airbag has a ventilation area closed by folded state for deployment, wherein the airbag has a ventilation area closed by foldable three-dimensional element before the inflation of the airbag, and wherein a restraining strap is provided with a first end that is detachably mounted in the interior of the airbag module or on a vehicle-fixed part, and with a second end affixed to the foldable three-dimensional element, such that during the inflation of the airbag, before the release of the detachably mounted first end of the retraining strap, the restraining strap holds the foldable three-dimensional element in a position closing the ventilation area, the foldable three-dimensional element is firmly connected to the airbag fabric via at least a first partial area of its perimeter and which can be folded around the first partial area such that, on release of the restraining strap, the foldable three-dimensional element deflected due to the effect of the gas flowing from the ventilation area and moves to a position opening the ventilation area of the airbag, wherein a second partial area of the perimeter of the foldable three-dimensional element not connected to the airbag is held in the position closing the ventilation area in a detachable overlap with a part of the airbag and the restraining strap running in the interior of the airbag and affixed to the foldable three-dimensional element, wherein the foldable three-dimensional element is configured as a tetrahedron having a triangular base area with triangular sides extending from a perimeter of the triangular base area to define a substantially pyramid-shape, wherein the airbag module is configured such that the foldable three-dimensional element rests with the first and second partial areas of the perimeter against the inside of the airbag fabric and, on inflation of the airbag, the second partial area extends outward through the ventilation opening, and that the restraining strap is pressed on the inside against the second partial area not connected to the airbag fabric or against the three-dimensional element.

14. The airbag module according to claim 13, wherein one triangular side of the tetrahedron forms the first partial area and is firmly connected to the airbag fabric and the detachable overlap forming the second partial area is arranged along each of the two other triangular sides.

15. An airbag module for installation into a motor vehicle having an airbag comprising an airbag fabric, an inflation device for inflation of the airbag in a folded state for deployment, wherein the airbag has a ventilation area closed by means of a foldable and a fixed three-dimensional element before the inflation of the airbag, and wherein a restraining strap is provided with a first end that is detachably mounted in the interior of the airbag module or mounted on a vehicle-fixed part, and with a second end connected with the foldable three-dimensional element, the fixed and the foldable three-dimensional elements engaging into each other and jointly cover the ventilation area in a mutual overlap manner such that during the inflation of the airbag, before the release of the detachably fixed first end of the restraining strap, the restraining strap holds the foldable three-dimensional element in a position cooperating with the fixed three-dimensional element for closing the ventilation area, the foldable three-dimensional element is firmly connected to the airbag fabric or to the fixed three dimensional element via at least a first partial area of its perimeter interfitting on release of the restraining strap, the foldable three-dimensional element is deflected due to the effect of the gas flowing from the ventilation area and moves to a position opening the ventilation area of the airbag, wherein a second partial area of the perimeter of the foldable three-dimensional element not connected to the airbag is held in a position opening the ventilation area in a detachable overlap with the fixed three-dimensional element and the restraining strap running in the interior of the airbag affixed to the foldable three-dimensional element, wherein the foldable three-dimensional element is configured as a tetrahedron having a triangular base area with triangular sides extending from a perimeter of the triangular base area to define a substantially pyramid-shape shape while the ventilation area of the airbag is closed by the foldable three-dimensional element.

16. An airbag module according to claim 15 further comprising in that the fixed and the foldable three-dimensional elements are formed of a flexible material compressible into a generally flat and condition when the airbag is in the folded condition, and assuming the three-dimensional configurations upon inflation of the airbag.

\* \* \* \* \*